US012597787B2

(12) United States Patent
Luo et al.

(10) Patent No.: US 12,597,787 B2
(45) Date of Patent: Apr. 7, 2026

(54) DATA LINE AND CHARGING DEVICE WITH SWITCHABLE CONFIGURATION CHANNEL CIRCUIT

(71) Applicant: VIVO MOBILE COMMUNICATION CO., LTD., Dongguan (CN)

(72) Inventors: Fangding Luo, Dongguan (CN); Tao Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 733 days.

(21) Appl. No.: 18/070,609

(22) Filed: Nov. 29, 2022

(65) Prior Publication Data

US 2023/0101861 A1 Mar. 30, 2023

Related U.S. Application Data

(63) Continuation of application No. PCT/CN2021/096260, filed on May 27, 2021.

(30) Foreign Application Priority Data

May 29, 2020 (CN) .......................... 202010479637.9

(51) Int. Cl.
*H01M 10/46* (2006.01)
*H01R 13/66* (2006.01)
(Continued)

(52) U.S. Cl.
CPC .......... *H02J 7/0042* (2013.01); *H01R 13/665* (2013.01); *H01R 13/70* (2013.01); *H02J 7/00034* (2020.01); *H02J 2207/30* (2020.01)

(58) Field of Classification Search
CPC .. H02J 7/0042; H02J 7/00034; H02J 7/00045; H02J 2207/30; H01R 13/701; H01R 13/665
(Continued)

(56) References Cited

U.S. PATENT DOCUMENTS 11,573,617 B2 * 2/2023 Sultenfuss ................ H02J 7/02
2013/0335010 A1 * 12/2013 Wu ........................ H02J 7/0071
320/107
(Continued)

FOREIGN PATENT DOCUMENTS

CN 204947285 U 1/2016
CN 107181145 A 9/2017
(Continued)

OTHER PUBLICATIONS

Machine translation of CN108233130A (Jun. 29, 2018) (Year: 2018).*
(Continued)

*Primary Examiner* — Edward Tso
(74) *Attorney, Agent, or Firm* — IPX PLLC

(57) ABSTRACT

A data line and a charging device are provided. The data line includes a Type-A interface, a first interface, a wire, and a circuit identification module. The Type-A interface is correspondingly connected to a VBUS pin, a D+ pin, a D− pin, and a GND pin in the first interface. The circuit identification module includes a pull-up resistor, a switch circuit, a filter circuit, and a comparator circuit. The comparator circuit controls the first end and the second end or the third end of the switch circuit to be connected.

11 Claims, 3 Drawing Sheets

(51) Int. Cl.
   *H01R 13/70* (2006.01)
   *H02J 7/00* (2006.01)

(58) Field of Classification Search
   USPC ................................. 320/107, 111, 114, 115
   See application file for complete search history.

(56) References Cited

U.S. PATENT DOCUMENTS

| | | | |
|---|---|---|---|
| 2016/0064978 A1* | 3/2016 | Lei ............................ | H02J 7/00 320/137 |
| 2017/0013095 A1* | 1/2017 | Blankenship ......... | H04W 72/20 |
| 2019/0104586 A1* | 4/2019 | Yu ......................... | H02J 7/0036 |
| 2019/0369708 A1 | 12/2019 | K | |
| 2019/0372376 A1* | 12/2019 | Kwak ................... | H01R 31/065 |
| 2023/0101461 A1* | 3/2023 | Luo ...................... | H02J 7/00034 320/107 |
| 2023/0140870 A1* | 5/2023 | Luo ...................... | G06F 13/4068 710/305 |

FOREIGN PATENT DOCUMENTS

| | | | |
|---|---|---|---|
| CN | 207051889 U | 2/2018 | |
| CN | 108233130 A | 6/2018 | |
| CN | 209860626 U | 12/2019 | |
| CN | 210129644 U | 3/2020 | |
| CN | 111509817 A | 8/2020 | |
| KR | 102468187 B1 * | 11/2022 | ........ H02J 7/007182 |

OTHER PUBLICATIONS

International Search Report issued in corresponding International Application No. PCT/CN2021/096260, mailed Aug. 13, 2021, 4 pages.
First Office Action issued in related Chinese Application No. 202010479637.9, mailed Apr. 23, 2021, 11 pages.
Ruan et al., "Introduction and Application of USB Type-C and PD Technology", Application of IC, p. 31-36, Apr. 30, 2017.
Chun-Ping Niou et al., "A Digital Peak Current Delay Compensation for Primary-Side Regulation Flyback Adaptor", 2018 International Symposium on VLSI Design, Automation and Test (VLSI-DAT).

* cited by examiner

<u>4</u>

1

DATA LINE AND CHARGING DEVICE WITH SWITCHABLE CONFIGURATION CHANNEL CIRCUIT

CROSS-REFERENCE TO RELATED APPLICATIONS

This application is a continuation of International Application No. PCT/CN2021/096260, filed on May 27, 2021, which claims priority to Chinese Patent Application No. 202010479637.9, filed on May 29, 2020. The entire contents of each of the above-identified applications are expressly incorporated herein by reference.

TECHNICAL FIELD

The present application relates to the field of communication technologies, and specifically, relates to a data line and a charging device.

BACKGROUND

With the development of science and technology, fast charging is more and more widely applied.

In the related art, the Power Delivery (PD) protocol is usually used for fast charging. A charger needs to perform communication through a Configuration Channel (CC) signal line, to support PD protocol charging. The charging device that supports PD protocol charging usually adopts the Type-C interface and is equipped with a Type-C to Type-C data line. A data line using the Type-A (or Standard-A) interface performs communication through a D+/D− signal line and cannot support PD protocol charging. However, currently the most widely used data line is a data line with a Type-A interface. As a result, the Type-A interface on a conventional data line does not support PD protocol charging.

SUMMARY

The embodiments of the present application provide a data line and a charging device.

In a first aspect, an embodiment of the present application provides a data line, including a Type-A interface and a first interface, where the Type-A interface and the first interface are connected through a wire, the Type-A interface and the first interface both include a VBUS pin, a CC pin, a D+ pin, a D− pin, and a GND pin, and the Type-A interface is connected to the VBUS pin, the D+ pin, the D− pin, and the GND pin in the first interface in a one-to-one correspondence; a circuit identification module is provided in the data line, the circuit identification module includes a pull-up resistor, a switch circuit, a filter circuit, and a comparator circuit, a first end of the switch circuit is connected to the CC pin of the first interface, a second end of the switch circuit is connected to a first end of the pull-up resistor, a third end of the switch circuit is connected to the CC pin of the Type-A interface, a second end of the pull-up resistor is connected to the VBUS pin of the first interface, a first end of the filter circuit is connected to the CC pin of the Type-A interface, a second end of the filter circuit is connected to a first input end of the comparator circuit, a second input end of the comparator circuit is connected to the VBUS pin of the first interface, and an output end of the comparator circuit is connected to a control end of the switch circuit; and under the control of the comparator circuit, the first end of the switch circuit is in communication with the second end or the third end of the switch circuit.

In a second aspect, an embodiment of the present application provides a charging device, including a data line and a charger, where the data line is the data line provided in the first aspect, the charger includes a Type-A female socket matched with the Type-A interface in the data line, and the Type-A female socket includes: a VBUS pin, a CC pin, a D+ pin, a D− pin, and a GND pin.

DESCRIPTION OF EMBODIMENTS

The following describes the technical solutions in the embodiments of the present application with reference to the accompanying drawings in the embodiments of the present application. The described embodiments are some but not all of the embodiments of the present application.

The terms "first," "second," and the like in this specification and claims of the present application are used to distinguish between similar objects instead of describing a specific order or sequence. It should be understood that the data used in this way is interchangeable in appropriate circumstances so that the embodiments of the present application described can be implemented in other orders than the order illustrated or described herein. In addition, "and/or" in the specification and claims represents at least one of connected objects. Symbol "/" in this specification generally represents an "or" relationship between associated objects.

With reference to the accompanying drawings, the following describes in detail the data line and the charging device in the embodiments of this application based on specific embodiments and application scenarios.

Figure 1:
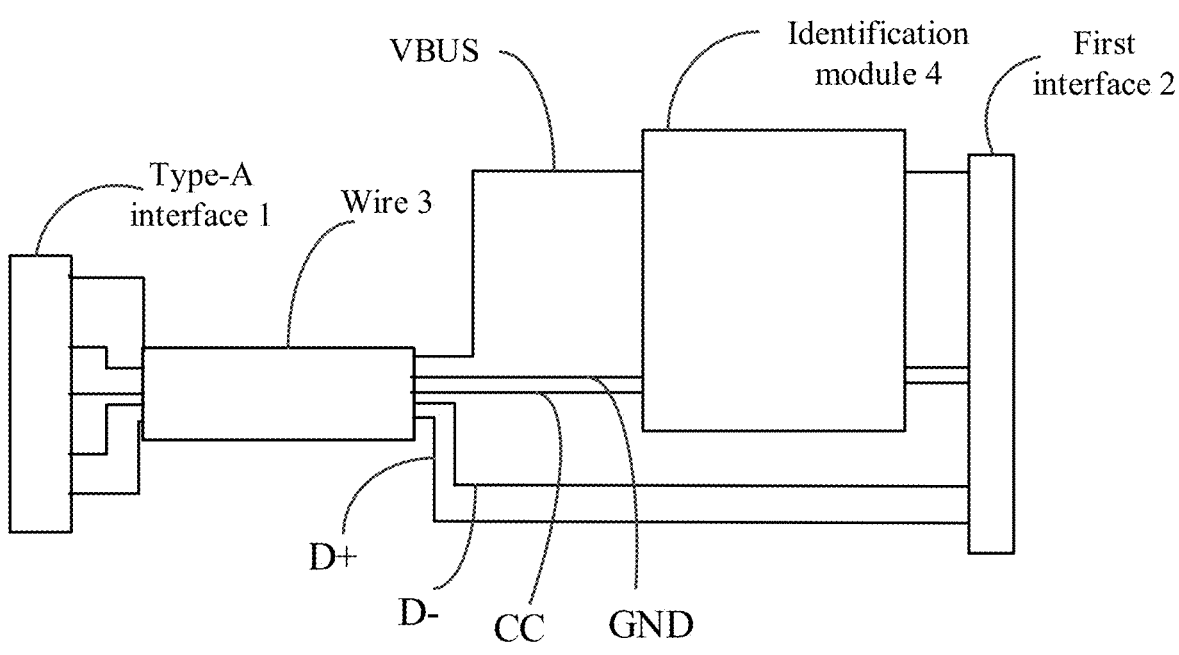
FIG. 1 is a structure of a data line provided by an embodiment of the present application.
Figure 2:
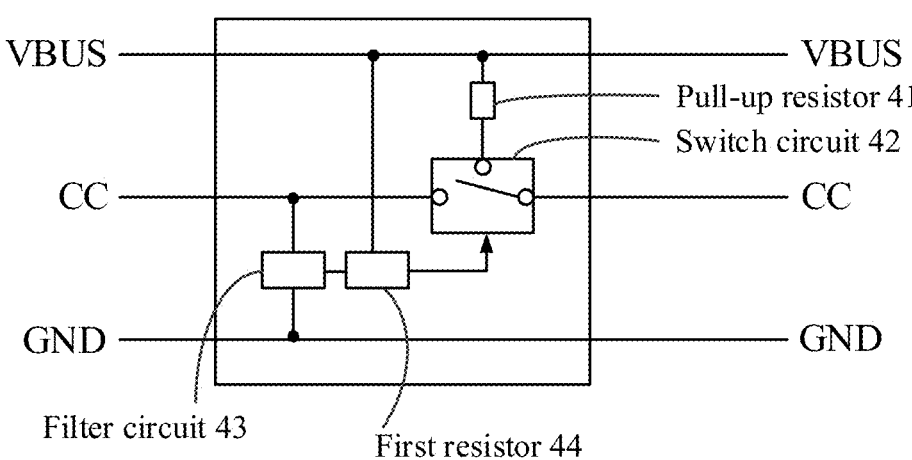
FIG. 2 is a structural diagram of an identification module in a data line provided by an embodiment of the present application.

Refer to both FIG. 1 and FIG. 2. FIG. 1 is a structure of a data line provided by an embodiment of the present application.

FIG. 2 is a structural diagram of an identification module in a data line provided by an embodiment of the present application.

The data line includes a Type-A interface 1 and a first interface 2, where the Type-A interface 1 and the first interface 2 are connected through a wire 3, the Type-A interface 1 and the first interface 2 both include a VBUS pin, a CC pin, a D+ pin, a D− pin, and a GND pin, and the Type-A interface 1 is connected to the VBUS pin, the D+ pin, the D− pin, and the GND pin in the first interface 2 in a one-to-one correspondence.

A circuit identification module 4 is provided in the data line, the circuit identification module 4 includes a pull-up resistor 41, a switch circuit 42, a filter circuit 43, and a comparator circuit 44. A first end of the switch circuit 42 is connected to the CC pin of the first interface 2, a second end of the switch circuit 42 is connected to a first end of the pull-up resistor 41, a third end of the switch circuit 42 is connected to the CC pin of the Type-A interface 1, a second end of the pull-up resistor 41 is connected to the VBUS pin of the first interface 2, a first end of the filter circuit 43 is connected to the CC pin of the Type-A interface 1, a second end of the filter circuit 43 is connected to a first input end of the comparator circuit 44, a second input end of the comparator circuit 44 is connected to the VBUS pin of the first interface 2, and an output end of the comparator circuit 44 is connected to a control end of the switch circuit 42.

Under the control of the comparator circuit 44, the first end of the switch circuit 42 is connected to the second end or the third end of the switch circuit 42.

In the related art, mobile terminals such as mobile phones often support fast charging of DP and Data Minus (DM) communication protocols. Communication protocols of DM charging communication and Data Positive (DP) charging communication use the D+ pin and the D− pin to transmit communication signals. However, electronic devices such as notebooks often support fast charging of the PD communication protocol, which uses the CC pin to transmit communication signals. Besides, in the related art, data lines supporting the PD communication protocol all use data lines in the form of Type-C to Type-C, and data lines supporting the DP/DM communication protocol all use data lines in the form of Type-A to Type-C. As a result, data lines supporting the PD communication protocol and data lines supporting the DP/DM communication protocol cannot be used universally.

The data line in this implementation is a data line including the Type-A interface 1, the CC pin is added to the Type-A interface 1, and when transmitting a signal of the CC communication protocol on the CC pin, the CC pin in the Type-A interface 1 is connected to the CC pin in the first interface 2, so that fast PD charging can be performed for a device to be charged. In addition, the first interface 2 in this embodiment may be a Type-C interface, so as to connect the data line with a device that is to be charged and that has a Type-C socket.

In some implementations, the first interface 2 may also be existing or other interfaces that may appear in the future, which are not specifically limited herein.

In addition, in practical applications, when the device to be charged only supports non-PD fast charging of the DP and DM communication protocols, the DP and DM communication channels on the data line are still in a connected state, so that the device to be charged can be provided with fast charging of DP and DM protocols.

It should be noted that when the first end of the switch circuit 42 is connected to the second end of the switch circuit 42, the first end of the switch circuit 42 is disconnected from the third end of the switch circuit 42; when the first end of the switch circuit 42 is connected to the third end of the switch circuit 42, the first end of the switch circuit 42 is disconnected from the second end of the switch circuit 42.

In addition, during operation, when the data line is not connected to the power supply, the first end of the switch circuit 42 can be connected to the third end of the switch circuit 42, so that when the data line is inserted into the device to be charged, the PD communication protocol channel is used to perform CC communication with the device to be charged. Besides, within a preset time of the CC communication, when a CC communication signal is obtained on the CC pin of the Type-A interface, the first end of the switch circuit 42 can be switched to connect to the second end of the switch circuit 42. The preset time may be 3 seconds, 5 seconds, etc., which is not specifically limited herein.

In addition, connection relationships between the VBUS pins, D+ pins, D− pins, and GND pins in the Type-A interface 1 and the first interface 2 and cables in the wire 3 are the same as those of pins and cables in the related art. For example: when the first interface 2 is a Type-C interface, connection relationships between pins between the Type-C interface and the Type-A interface 1 and cables in the wire 3 may be shown in Table 1 below:

TABLE 1

| Type-C interface | Wire | Type-A interface |
| --- | --- | --- |
| GND pin | GND cable | GND pin |
| VBUS pin | VBUS cable | VBUS pin |
| CC1 pin | CC1 cable | CC pin |
| CC2 pin | | |
| D+ pin | D+ cable | D+ pin |
| D− pin | D− cable | D− pin |

In some implementations, when a CC communication signal is received on the CC pin of the Type-A interface 1, the CC communication signal is adjusted into a stable analog signal by the filter circuit 43, and the analog signal is compared by the comparator circuit 44, so that when there is a signal on the CC pin of the Type-A interface 1, the comparator circuit 44 outputs a first control signal, and when there is no signal on the CC pin of the Type-A interface 1, the comparator circuit 44 outputs a second control signal. Therefore, the outputted first control signal and second control signal are more accurate, and the on or off state of the switch circuit 42 can be controlled more accurately according to the first control signal and the second control signal.

In some implementations, when there is a signal on the CC pin of the Type-A interface 1, the analog signal output by the filter circuit may be a high-level signal. In this way, the comparator circuit 44 outputs the first control signal in response to the high-level signal, and the switch circuit 42 connects the first end and the third end of the comparator in response to the first control signal. When there is no signal on the CC pin of the Type-A interface 1, the analog signal output by the filter circuit 43 may be a low-level signal. In this way, the comparator circuit 44 outputs the second control signal in response to the low-level signal, and the switch circuit 42 connects the first end and the second end in response to the second control signal.

In some implementations, the filter circuit 43 can also adjust the CC communication signal received on the CC pin of the Type-A interface 1, to obtain other analog signals, as long as analog signals are different when there is a signal and no signal on the CC pin of the Type-A interface 1. The different analog signals are distinguished by the comparator circuit 44, so as to generate a control signal with higher accuracy and more stability.

In some implementations, a CC pin is disposed in the Type-A interface, and the communication signal transmitted on the CC pin in the Type-A interface is adjusted into a control signal by the filter circuit and the comparator circuit, to control the CC pin to connect to or disconnect from the CC pin in the first interface. In this way, the CC pin is controlled to connect to the CC pin in the first interface when there is a signal on the CC pin in the Type-A interface, so that the PD communication channel in the data line is connected to support PD fast charging. When there is no signal on the CC pin in the Type-A interface, the CC pin is controlled to disconnect from the CC pin in the first interface, so that the PD communication channel in the data line is disconnected and PD fast charging is not supported. In this way, when the device that is to be charged and that is connected to the data line supports PD fast charging, the PD communication channel in the data line can be connected, and PD fast charging may be performed on the device to be charged; when the device that is to be charged and that is connected to the data line does not support PD fast charging, the PD communication channel in the data line is disconnected, but the DP and DM communication is always connected, so that fast charging with DP/DM protocol communication may be performed on the device to be charged.

In some implementations, the circuit identification module 4 is disposed in the wire 3, and a distance between the circuit identification module 4 and one end of the first interface 2 is smaller than a distance between the circuit identification module 4 and one end of the Type-A interface 1.

In some implementations, the identification module 4 is disposed in the wire 3 to switch a corresponding connection relationship between the CC pin in the Type-A interface 1 and the CC pin in the first interface 2 in the wire 3.

In addition, that the distance between the circuit identification module 4 and one end of the first interface 2 is smaller than the distance between the circuit identification module 4 and one end of the Type-A interface 1 may be implemented by disposing the identification module 4 closer to the first interface 2. This can avoid that when a circuit board structure including the identification module 4 is disposed in the middle of the wire 3, the smoothness and aesthetics of the wire 3 are affected. In some implementations, that the distance between the circuit identification module 4 and one end of the first interface 2 is smaller than the distance between the circuit identification module 4 and one end of the Type-A interface 1 may also be implemented by disposing the identification module 4 close to the Type-A interface 1. This can also avoid that when a circuit module with a large diameter is disposed in the middle of the wire 3, the smoothness and aesthetics of the wire 3 are affected.

In some implementations, when the circuit identification module 4 is disposed in the wire 3, the third end of the switch circuit 42 is connected to the CC cable of the wire 3 connected to the CC pin of the Type-A interface 1, the second end of the pull-up resistor 41 is connected to the VBUS line in the wire 3, the first end of the filter circuit 43 is connected to the CC cable of the wire 3 connected to the CC pin of the Type-A interface 1, the second end of the filter circuit 43 is connected to the GND line in the wire 3, two ends of the VBUS line are connected to the VBUS pin of the Type-A interface 1 and the VBUS pin of the first interface 2 respectively, and two ends of a GND cable are connected to the GND pin of the Type-A interface 1 and the GND pin of the first interface 2 respectively.

Figure 3:
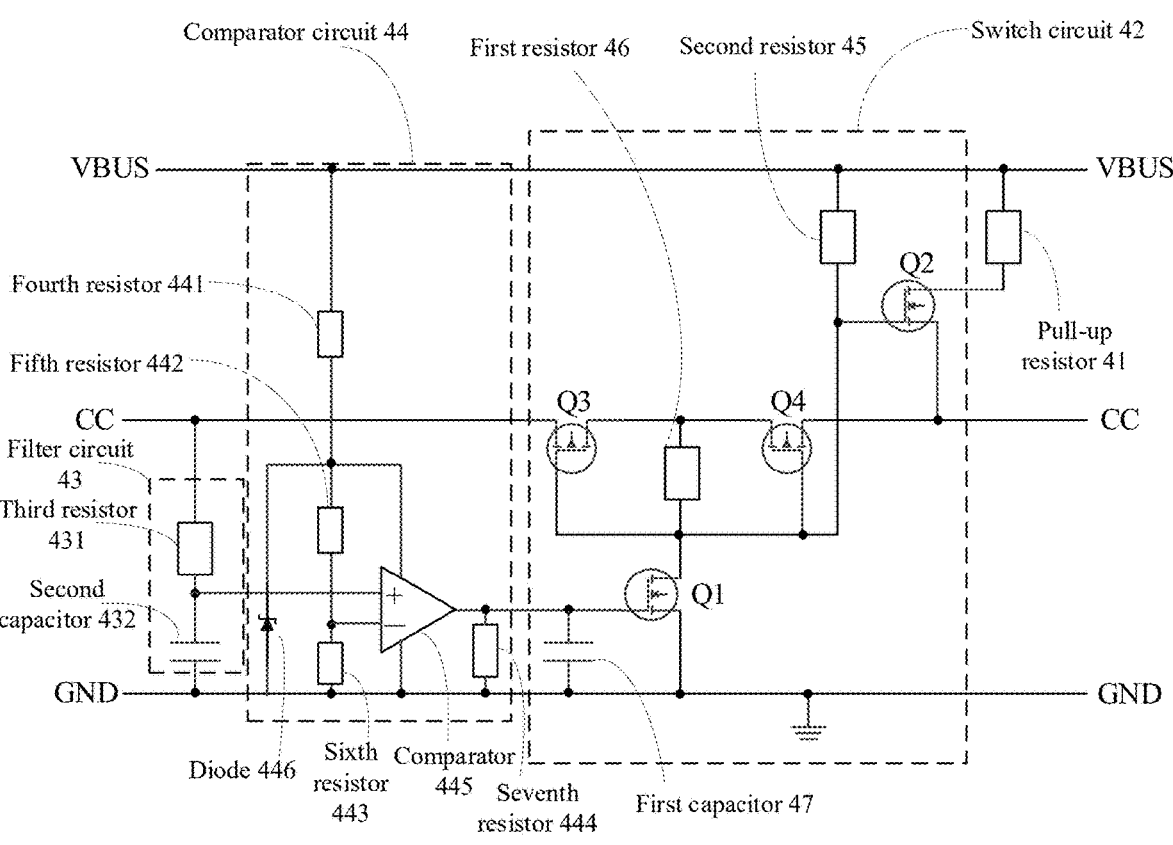
FIG. 3 is a circuit diagram of an identification module in a data line provided by an embodiment of the present application.

In some implementations, as shown in FIG. 3, the switch circuit 42 includes a first switch transistor Q1, a second switch transistor Q2, a third switch transistor Q3, a fourth switch transistor Q4, a first resistor 45, a second resistor 46, and a first capacitor 47.

A first electrode of the first switch transistor Q1 is a control end of the switch circuit 42, the first electrode of the first switch transistor Q1 is also connected to the GND pin through the first capacitor 47, a second electrode of the first switch transistor Q1 is connected to a first electrode of the second switch transistor Q2, a first electrode of the third switch transistor Q3, and a first electrode of the fourth switch transistor Q4, and a third electrode of the first switch transistor Q1 is connected to the GND pin of the first interface 2.

The first electrode of the second switch transistor Q2 is also connected to the VBUS pin of the first interface 2 through the first resistor 44, a second electrode of the second switch transistor Q2 is the second end of the switch circuit 42, and a third electrode of the second switch transistor Q2 is the first end of the switch circuit 42.

A second electrode of the third switch transistor Q3 is the third end of the switch circuit 42, and a third electrode of the third switch transistor Q3 is connected to the second electrode of the first switch transistor Q1 through the second resistor 45.

A second electrode of the fourth switch transistor Q4 is connected to the third electrode of the second switch transistor Q2, and a third electrode of the fourth switch transistor Q4 is connected to the third electrode of the third switch transistor Q3.

When there is no signal on the CC pin of the Type-A interface 1, the first switch transistor Q1, the third switch transistor Q3, and the fourth switch transistor Q4 are in a disconnected state and the second switch transistor Q2 is in the connected state; when there is a signal on the CC pin of the Type-A interface 1, the first switch transistor Q1, the third switch transistor Q3, and the fourth switch transistor Q4 are all in a connected state and the second switch transistor Q2 is in a disconnected state.

In some implementations, when there is signal transmission on the CC pin of the Type-A interface 1, the filter circuit 43 adjusts the signal on the CC pin of the Type-A interface 1 to a high-level signal, and the comparator circuit outputs the first control signal according to the high-level signal, where the first control signal may be a high-level signal with a first value. In this way, when the first electrode of the first switch transistor Q1 receives the high-level signal with the first value, the first switch transistor Q1 is controlled to be connected, that is, the second electrode and the third electrode of the first switch transistor Q1 are connected. In this case, the first electrode of the second switch transistor Q2, the first electrode of the third switch transistor Q3, and the first electrode of the fourth switch transistor Q4 are connected to the GND pin through the first switch transistor Q1, so that the third switch transistor Q3 and the fourth switch transistor Q4 are connected, that is, the second electrode and the third electrode of the third switch transistor Q3 are connected, and the second electrode and the third electrode of the fourth switch transistor Q4 are connected. Besides, since the first electrode of the second switch transistor Q2 is pulled down to connect to the GND pin through the first switch transistor Q1, the second switch transistor Q2 is turned off, that is, the second electrode and the third electrode of the second switch transistor Q2 are disconnected.

In some implementations, the first switch transistor Q1 and the second switch transistor Q2 are N-type transistors, and the third switch transistor Q3 and the fourth switch transistor Q4 are P-type transistors. In some implementations, the first switch transistor Q1 and the second switch transistor Q2 are N-Metal-Oxide Semiconductor (NMOS) transistors, and the third switch transistor Q3 and the fourth switch transistor Q4 are P-Metal-Oxide Semiconductor (PMOS) transistors.

In some implementations, the first electrode of the first switch transistor Q1 may be a gate electrode, the second electrode of the first switch transistor Q1 may be a drain electrode, and a third electrode of the first switch transistor Q1 may be a source electrode; the first electrode of the second switch transistor Q2 may be a gate electrode, the second electrode of the second switch transistor Q2 may be a drain electrode, and the third electrode of the second switch transistor Q2 may be a source electrode. In this way, when there is a signal on the CC pin of the Type-A interface 1, the first electrode of the first switch transistor Q1 receives a high-level signal, so that the second electrode and the third electrode are connected. In this case, the gate electrode of the second switch transistor Q2 is connected to the GND pin, so that the second switch transistor Q2 is disconnected.

In addition, the first electrodes of the third switch transistor Q3 and the fourth switch transistor Q4 are gate electrodes. In this case, when the first switch transistor Q1 is connected, the first electrodes of the third switch transistor Q3 and the fourth switch transistor Q4 are pulled down to the GND pin through the first switch transistor Q1, so that the PMOS transistors Q3 and Q4 are connected. In this case, since the first switch transistor Q1 is connected, the first electrode of Q2 is also pulled down to the GND pin through the first switch transistor Q1, so that the NMOS transistor Q2 is disconnected.

Correspondingly, when there is no signal on the CC pin of the Type-A interface 1, the filter circuit 43 does not output a level signal, that is, the filter circuit 43 outputs a low-level signal, and the comparator circuit outputs the second control signal according to the low-level signal, where the second control signal can be a low-level signal with a second value. The first electrode of the first switch transistor Q1 receives the low-level signal with the second value, so that the first switch transistor Q1 is disconnected, and the first electrode of the second switch transistor Q2 is pulled down to the GND pin through the first switch transistor Q1, so that the NMOS transistor Q2 is connected. Besides, when the first switch transistor Q1 is turned off, the first electrodes of the third switch transistor Q3 and the fourth switch transistor Q4 are pulled up to the VBUS pin through the first resistor 45, so that the PMOS transistors Q3 and Q4 are disconnected.

In some implementations, the first switch transistor Q1, the second switch transistor Q2, the third switch transistor Q3, and the fourth switch transistor Q4 may also be other types of transistors, and connection circuit of the switch transistors in the switch circuit 42 are changed accordingly, to establish or cut off the connection between the CC pin of the Type-A interface 1 and the CC pin of the first interface 2 according to the CC signal adjusted by the filter circuit 43. This is not specifically limited herein.

In some implementations, as shown in FIG. 3, the second electrode of the first switch transistor Q1 is connected to the third electrodes of the third switch transistor Q3 and the fourth switch transistor Q4 through the second resistor 46. This can avoid that the first electrode and the second electrode of Q3 and Q4 are short-circuited when Q1 is connected.

In addition, as shown in FIG. 3, the first electrode of the first switch transistor Q1 is also connected to the GND pin through the first capacitor 47. When the control signal output by the comparator circuit 44 is switched from the first control signal to the second control signal, the first capacitor 47 may be discharged, so that the first switch transistor Q1 is still connected during the discharge time of the first capacitor. In this way, the time delay of the switch circuit 42 can be increased and this avoids that when the control signal output by the comparator circuit 44 is switched, Q1 is frequently connected and disconnected.

The switch circuit 42, in some implementations, may be an analog signal control circuit. This can avoid that a control unit is disposed in the identification module 4 and a connected or disconnected state of the switch circuit 42 is controlled according to a digital control signal sent by the control unit, so that production costs of the switch circuit 42 can be reduced.

In some implementations, as shown in FIG. 2, the switch circuit includes a switch 42, the first end of the switch circuit is a stationary end of the switch 42, and the second end and the third end of the switch circuit are both movable ends of switch 42.

In some implementations, the switch 42 can be switched according to the control signal transmitted by the filter circuit 43, and the control signal can be any one of an analog signal or a digital control signal. In some implementations, when there is a signal on the CC pin of the Type-A interface 1, the comparator circuit 44 sends the first control signal to the switch 42, and the switch 42 responds to the first control signal to connect the movable end to the third end, that is, the CC pin of the first interface 2 is connected to the CC pin of the Type-A interface 1; when there is no signal on the CC pin of the Type-A interface 1, the comparator circuit 44 sends the second control signal to the switch 42, and the switch 42 responds to the second control signal to connect the movable end to the second end, that is, connect the CC pin of the first interface 2 to the VBUS pin through the pull-up resistor 41.

In some implementations, a control unit may also be provided in the switch circuit, and the control unit is connected to the comparator circuit 44 and the switch 42 respectively, so as to convert the analog signal output by the comparator circuit 44 into a digital control signal, so as to control the connected or disconnected state of the switch 42 through the digital control signal.

In some implementations, the structure of the switch circuit can be simplified by providing the switch 42 in the switch circuit.

In some implementations, the filter circuit 43 is an RC filter circuit.

In some implementations, when there is a signal on the CC pin of Type-A interface 1, the signal can be a fluctuating level signal, and the fluctuating level signal can be adjusted to a relatively stable level signal through the RC filter circuit and inputted to the comparator circuit 44, so that the comparator circuit 44 outputs a more accurate and stable control signal. In this way, the control signal output by the comparator circuit 44 can be more stable and reliable.

Further, as shown in FIG. 3, the filter circuit 43 includes a third resistor 431 and a second capacitor 432.

The first end of the third resistor 431 is connected to the CC pin of the Type-A interface 1, the second end of the third resistor 431 is connected to the first end of the first capacitor 432, and the second end of the first capacitor 432 is connected to the GND pin of the first interface 2, and the first end of the first capacitor 432 is also connected to the first input end of the comparator circuit 44.

In some implementations, when there is no signal on the CC pin of the Type-A interface 1, the filter circuit 43 outputs a low-level signal (which can be a level signal with a value of 0). When there is a fluctuating level signal on the CC pin of the Type-A interface 1 and the level signal increases, the first capacitor 432 is charged, and when the level signal decreases, the first capacitor 432 discharges, so that the filter circuit 43 outputs a stable high-level signal (a level signal with a value greater than 0), and inputs the high-level signal to the comparator circuit 44 for comparison, so that the comparator circuit 44 outputs an accurate control signal to control the connected or disconnected state of the switch circuit 42.

In some implementations, the comparator circuit 44 can be configured to compare the level signal output by the filter circuit 43 and output an accurate control signal. Compared with directly controlling the connected or disconnected state of the switch circuit 42 according to the level signal output by the filter circuit 43, since the level signal output by the filter circuit 43 is a level value fluctuating in a value interval, in this implementation, the connected or disconnected state of the switch circuit 42 is controlled according to the control signal with an accurate value output by the comparator circuit 44, so that the control sensitivity of the switch circuit 42 can be improved.

In some implementations, a capacitance value of the second capacitor 432 is greater than a preset capacitance value.

In some implementations, the preset capacitance value can be determined according to the recognition accuracy of the comparator circuit 44 and the level value and variation characteristics of the signal on the CC pin of the Type-A interface 1, which are not specifically limited herein.

In some implementations, the capacitance value of the second capacitor 432 is larger than the preset capacitance value, so that when the level value of the signal transmitted on the CC pin of the Type-A interface 1 fluctuates and the level of the transmitted signal increases, the second capacitor 432 is charged, and when the level of the transmitted signal decreases, the second capacitor 432 discharges. When there is no transmission signal on the CC pin of Type-A interface 1, the second capacitor 432 is exhausted, and therefore there is no output level value. This increases the difference between the analog signals output by the filter circuit 43 when a low-level signal is transmitted on the CC pin of the Type-A interface 1 and when no signal is transmitted on the CC pin of the Type-A interface 1, thereby improving the difference of the control signals output by the controller circuit 44 and the control accuracy of the switch circuit 42.

In some implementations, as shown in FIG. 3, the comparator circuit 44 includes: a fourth resistor 441, a fifth resistor 442, a sixth resistor 443, a seventh resistor 444, a comparator 445, and a diode 446.

A first end of the fourth resistor 441 is the second input end of the comparator circuit 44, a second end of the fourth resistor 441 is connected to a first end of the fifth resistor 442, a second end of the fifth resistor 442 is connected to a first end of the sixth resistor 443, and a second end of the sixth resistor 443 is connected to the GND pin.

The first end of the comparator 445 is the output end of the comparator circuit 44, the second end of the comparator 445 is the first input end of the comparator circuit 44, a third end of the comparator circuit 44 is connected between the fifth resistor 442 and the six resistor 443, a fourth end of the comparator circuit 44 is connected to the GND pin, a fifth end of the comparator circuit 44 is connected to a first end of the diode 446, the second end of the fourth resistor 441, the first end of the fifth resistor 442, the first end of the comparator 445 is also connected to the GND pin through the seventh resistor 444, a the second end of the diode 446 is connected to the GND pin.

When the value of the electrical signal on the second end of the comparator 445 is greater than the value of the electrical signal on the third end of the comparator 445, the comparator 445 outputs the first control signal, and the switch circuit 42 responds to the first control signal to connect the first end and the third end of the comparator; when the value of the electrical signal on the second end of the comparator 445 is less than or equal to the value of the electrical signal on the third end of the comparator 445, the comparator 445 outputs the second control signal, and the switch circuit 42 responds to the second control signal to connect the first end and the second end of the comparator.

In some implementations, the voltage of the comparator 445 is divided by the fifth resistor 442 and the sixth resistor 443, and the current of the comparator 445 is limited by the fourth resistor 441. The diode 446 can maintain the voltage of the fifth end of the comparator 445 at a fixed voltage value, for example: 5V (volts), so that when there is a signal on the CC pin of the Type-A interface 1, the high-level signal output by the filter circuit 43 is transmitted to the second end of the comparator 445, so that the level value on the second end of the comparator 445 is greater than the level value of the third end of the comparator 445. In this case, the first end of the comparator 445 outputs the first control signal with the first level value, and the switch circuit 42 responds to the first control signal to connect the first end and the third end of the comparator. Besides, when there is no signal on the CC pin of the Type-A interface 1, the low-level signal output by the filter circuit 43 is transmitted to the second end of the comparator 445, so that the level value on the second end of the comparator 445 is less than or equal to the level value of the third end of the comparator 445. In this case, the first end of the comparator 445 outputs the second control signal of the second level value, the second level value is smaller than the first level value, and the switch circuit 42 responds to the second control signal to connect the first end and the second end of the comparator.

In addition, as shown in FIG. 3, the first end of the comparator 445 is connected to the ground end through the seventh resistor 444, so that there is a potential difference between the first end of the comparator 445 and the ground end, to avoid that the first end of the comparator 445 is grounded directly.

In some implementations, the comparator circuit is formed by the comparator 445, the voltage dividing resistors (e.g., the fifth resistor 442, the sixth resistor 443), the current limiting resistor (e.g., the fourth resistor 441), the voltage regulator device (e.g., the diode 446), etc., so that when there is a signal or no signal on the CC pin of the Type-A interface 1, control signals of different level values are output to the switch circuit 42, so as to control the connected or disconnected state of the switch circuit 42.

Figure 4:
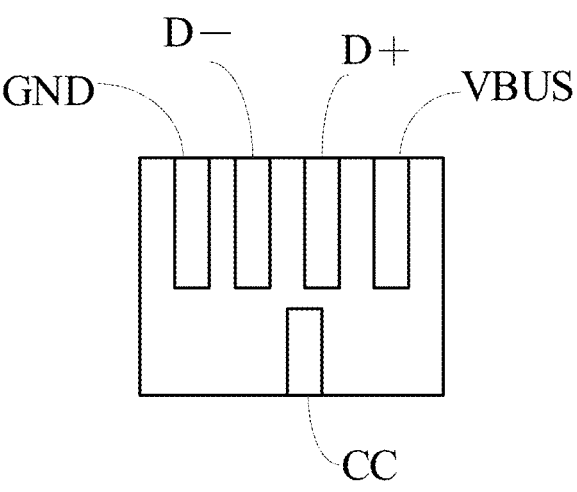
FIG. 4 is a structural diagram of a Type-A interface in a data line provided by an embodiment of the present application.

In some implementations, as shown in FIG. 4, a first side of the Type-A interface 1 is provided with a GND pin, a D+ pin, a D− pin, and a VBUS pin, a second side of the Type-A interface 1 is provided with a CC pin, and the first side and the second side of the Type-A interface 1 are opposite sides.

In some implementations, the distribution position of each pin in the Type-A interface 1 can also be exchanged or changed, which is not specifically limited herein. In addition, the structure and working principle of the VBUS pin and the GND pin are the same as those of the VBUS pin and the GND pin in the related art, and are not described in detail herein.

In some implementations, the CC pin is disposed on the second side of the Type-A interface 1, so that the GND pin, the D+ pin, the D− pin, and the VBUS pin on the first side of the Type-A interface 1 can have the same structure and position distribution as those in the Type-A interface in the related art, so that the data line provided in this embodiment of the present application is compatible with the conventional Type-A female socket.

When the data line provided in the embodiment of the present application is connected to a charger provided with a conventional Type-A socket, since the CC pin is not disposed in the conventional Type-A socket, the CC pin in the Type-A interface 1 cannot receive a CC signal. In this case, the charging device only supports the fast charging of the DP/DM communication protocol.

Embodiments of the present application further provide a charging device, where the charging device includes a charger and the Data line provided by the above embodiments. The charger includes a Type-A female socket matched with the Type-A interface in the data line, and the Type-A female socket includes: a VBUS pin, a CC pin, a D+ pin, a D− pin, and a GND pin.

The Type-A female socket matched with the Type-A interface in the data line can be understood as: when the Type-A interface of the data line 2 is inserted into the Type-A female socket of the charger 1, the Type-A interface is connected to the same pin in the Type-A female socket.

In addition, the charger also includes a PD charging module and a D+/D− charging module. In some implementations, the PD charging module is connected to the CC pin, so as to communicate, through the CC pin with the PD protocol, with the device to be charged, thereby supporting PD fast charging. The D+/D− charging module is connected to the D+ pin and the D− pin to communicate, through the D+ pin and the D− pin with the DP/DM protocol, with the device to be charged, thereby supporting DP/DM fast charging.

It should be noted that, in this implementation, the specific working process of the charging device corresponds to the working process of the data line 2 in the above-mentioned embodiment, which will not be repeated herein.

In addition, when the pins in the Type-A interface are distributed as shown in FIG. 4, the Type-A female socket matched with the Type-A interface can also be connected to the Type-A interface in the conventional data line. Besides, when the Type-A female socket of the above-mentioned charger is connected to the Type-A interface in the conventional data line, only DP/DM protocol charging is supported.

The charging device provided by the embodiments of the present application has a Type-A interface, supports PD protocol charging and DP/DM protocol charging, and has the same beneficial effects as the data line provided by the embodiments of the present application, which is not repeated herein.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and electronic devices in the embodiments of the present application is not limited to performing the functions in the order shown or discussed, but may also include performing functions in a substantially simultaneous manner or in the reverse order depending on the functions involved, for example, the methods described may be performed in an order different from that described, and various steps may also be added, omitted, or combined. In addition, features described with reference to some examples may be combined in other examples.

Based on the descriptions of the foregoing implementations, a person skilled in the art may understand that the method in the foregoing embodiment may be implemented by software in addition to a necessary universal hardware platform or by hardware only. Based on such an understanding, the technical solutions of this application essentially, or the part contributing to the related art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of the present application are described above with reference to the accompanying drawings, but the present application is not limited to the foregoing specific implementations. The foregoing specific implementations are merely schematic instead of restrictive. Under enlightenment of the present application, a person of ordinary skills in the art may make many forms without departing from aims and the protection scope of claims of the present application, all of which fall within the protection scope of the present application.

The invention claimed is:

1. A data line, comprising:
a Type-A interface;
a first interface, wherein the Type-A interface and the first interface are connected through a wire, the Type-A interface and the first interface both comprise a VBUS pin, a CC pin, a D+ pin, a D− pin, and a GND pin, and the Type-A interface is connected to the VBUS pin, the D+ pin, the D− pin, and the GND pin in the first interface in a one-to-one correspondence; and
a circuit identification module, wherein the circuit identification module comprises a pull-up resistor, a switch circuit, a filter circuit, and a comparator circuit, wherein a first end of the switch circuit is connected to the CC pin of the first interface, a second end of the switch circuit is connected to a first end of the pull-up resistor, a third end of the switch circuit is connected to the CC pin of the Type-A interface, a second end of the pull-up resistor is connected to the VBUS pin of the first interface, a first end of the filter circuit is connected to the CC pin of the Type-A interface, a second end of the filter circuit is connected to a first input end of the comparator circuit, a second input end of the comparator circuit is connected to the VBUS pin of the first interface, and an output end of the comparator circuit is connected to a control end of the switch circuit, and wherein under the control of the comparator circuit, the first end of the switch circuit is in communication with the second end or the third end of the switch circuit.

2. The data line according to claim 1, wherein the first interface is a Type-C interface.

3. The data line according to claim 1, wherein the circuit identification module is disposed in the wire, and a distance between the circuit identification module and one end of the first interface is smaller than a distance between the circuit identification module and one end of the Type-A interface.

4. The data line according to claim 1, wherein the switch circuit comprises a first switch transistor, a second switch transistor, a third switch transistor, a fourth switch transistor, a first resistor, a second resistor, and a first capacitor,
wherein a first electrode of the first switch transistor is the control end of the switch circuit, the first electrode of the first switch transistor is also connected to the GND pin through the first capacitor,
wherein a second electrode of the first switch transistor is connected to a first electrode of the second switch transistor, a first electrode of the third switch transistor, and a first electrode of the fourth switch transistor, wherein a third electrode of the first switch transistor is connected to the GND pin of the first interface, wherein the first electrode of the second switch transistor is connected to the VBUS pin of the first interface through the first resistor, a second electrode of the second switch transistor is the second end of the switch circuit, and a third electrode of the second switch transistor is the first end of the switch circuit, wherein a second electrode of the third switch transistor is the third end of the switch circuit, and a third electrode of the third switch transistor is connected to the second electrode of the first switch transistor through the second resistor, wherein a second electrode of the fourth switch transistor is connected to the third electrode of the second switch transistor, and a third electrode of the fourth switch transistor is connected to the third electrode of the third switch transistor, wherein when there is no signal on the CC pin of the Type-A interface, the first switch transistor, the third switch transistor, and the fourth switch transistor are in a disconnected state and the second switch transistor is in a connected state, and wherein when there is a signal on the CC pin of the Type-A interface, the first switch transistor, the third switch transistor, and the fourth switch transistor are all in a connected state and the second switch transistor is in a disconnected state.

5. The data line according to claim 4, wherein the first switch transistor and the second switch transistor are N-type transistors, and the third switch transistor and the fourth switch transistor are P-type transistors.

6. The data line according to claim 5, wherein the first switch transistor and the second switch transistor are NMOS transistors, and the third switch transistor and the fourth switch transistor are PMOS transistors.

7. The data line according to claim 1, wherein the switch circuit includes a switch, the first end of the switch circuit is a stationary end of the switch, and the second end and the third end of the switch circuit are both movable ends of switch.

8. The data line according to claim 1, wherein the filter circuit is an RC filter circuit.

9. The data line according to claim 8, wherein the filter circuit comprises a third resistor and a second capacitor, and wherein a first end of the third resistor is connected to the CC pin of the Type-A interface, a second end of the third resistor is connected to a first end of the second capacitor, a second end of the second capacitor is connected to the GND pin of the first interface, and the first end of the second capacitor is also connected to the first input end of the comparator circuit.

10. The data line according to claim 9, wherein the comparator circuit comprises: a fourth resistor, a fifth resistor, a sixth resistor, a seventh resistor, a comparator, and a diode, wherein a first end of the fourth resistor is the second input end of the comparator circuit, a second end of the fourth resistor is connected to a first end of the fifth resistor, a second end of the fifth resistor is connected to a first end of the sixth resistor, and a second end of the sixth resistor is connected to the GND pin, wherein a first end of the comparator is the output end of the comparator circuit, a second end of the comparator is the first input end of the comparator circuit, a third end of the comparator circuit is connected between the fifth resistor and the six resistor, a fourth end of the comparator circuit is connected to the GND pin, and a fifth end of the comparator circuit is connected to a first end of the diode, the second end of the fourth resistor, and the first end of the fifth resistor, wherein the first end of the comparator is also connected to the GND pin through the seventh resistor, wherein a second end of the diode is connected to the GND pin, wherein when the value of the electrical signal on the second end of the comparator is greater than the value of the electrical signal on the third end of the comparator, the comparator outputs a first control signal, and the switch circuit responds to the first control signal to connect the first end and the third end of the comparator, wherein when the value of the electrical signal on the second end of the comparator is less than or equal to the value of the electrical signal on the third end of the comparator, the comparator outputs a second control signal, and wherein the switch circuit responds to the second control signal to connect the first end and the second end of the comparator.

11. A charging device, comprising:
a data line, comprising:
  a Type-A interface;
  a first interface, wherein the Type-A interface and the first interface are connected through a wire, the Type-A interface and the first interface both comprise a VBUS pin, a CC pin, a D+ pin, a D− pin, and a GND pin, and the Type-A interface is connected to the VBUS pin, the D+ pin, the D− pin, and the GND pin in the first interface in a one-to-one correspondence; and
  a circuit identification module, wherein the circuit identification module comprises a pull-up resistor, a switch circuit, a filter circuit, and a comparator circuit, wherein a first end of the switch circuit is connected to the CC pin of the first interface, a second end of the switch circuit is connected to a first end of the pull-up resistor, a third end of the switch circuit is connected to the CC pin of the Type-A interface, a second end of the pull-up resistor is connected to the VBUS pin of the first interface, a first end of the filter circuit is connected to the CC pin of the Type-A interface, a second end of the filter circuit is connected to a first input end of the comparator circuit, a second input end of the comparator circuit is connected to the VBUS pin of the first interface, and an output end of the comparator circuit is connected to a control end of the switch circuit, and wherein under the control of the comparator circuit, the first end of the switch circuit is in communication with the second end or the third end of the switch circuit; and
a charger, comprising:
  a Type-A female socket matched with the Type-A interface in the data line, wherein the Type-A female socket comprises: a VBUS pin, a CC pin, a D+ pin, a D− pin, and a GND pin that matched with those of the Type-A interface in the data line.

* * * * *